United States Patent [19]

Greve et al.

[11] Patent Number: 5,599,402
[45] Date of Patent: Feb. 4, 1997

[54] METHOD FOR CLEANING PLATE HEAT EXCHANGERS

[75] Inventors: Folmer Greve, Agedrup, Denmark; Christian Stutz, Ettingen, Switzerland

[73] Assignee: Novo Nordisk A/S, Bagsvaerd, Denmark

[21] Appl. No.: 107,712

[22] PCT Filed: Mar. 6, 1992

[86] PCT No.: PCT/DK92/00072

§ 371 Date: Aug. 12, 1993

§ 102(e) Date: Aug. 12, 1993

[87] PCT Pub. No.: WO92/15834

PCT Pub. Date: Sep. 17, 1992

[30] Foreign Application Priority Data

Mar. 8, 1991 [EP] European Pat. Off. ............ 91610015

[51] Int. Cl.⁶ .................. B08B 9/00; C11D 3/386; F28G 13/00
[52] U.S. Cl. .............. 134/22.19; 134/34; 210/632; 435/264; 510/245; 510/392
[58] Field of Search ............... 134/22.14, 22.19, 134/22.1, 22.11; 210/632; 435/99, 264

[56] References Cited

U.S. PATENT DOCUMENTS

| | | | |
|---|---|---|---|
| 3,406,089 | 10/1968 | Yerkes et al. | 162/199 |
| 4,338,399 | 7/1982 | Weil et al. | 435/99 |
| 4,388,330 | 6/1983 | Wobben et al. | 426/51 |
| 4,936,994 | 6/1990 | Wiatr | 210/632 |

FOREIGN PATENT DOCUMENTS

| | | |
|---|---|---|
| 0001470 | 4/1979 | European Pat. Off. . |
| 3045817 | 6/1981 | Germany . |
| 3906124 | 8/1990 | Germany . |
| 58-187847 | 11/1983 | Japan ............ 134/22.19 |
| 2094927 | 9/1982 | United Kingdom . |
| 2115820 | 9/1983 | United Kingdom . |

*Primary Examiner*—Paul Lieberman
*Assistant Examiner*—Lorna M. Douyon
*Attorney, Agent, or Firm*—Steve T. Zelson, Esq.; Elias J. Lambiris, Esq.

[57] ABSTRACT

The method for cleaning of heat exchangers after passage of fluid, pulpy material through the heat exchangers is characterized by the fact that the heat exchangers are exposed to a cip (cleaning in place) treatment with a solution of an enzyme preparation, which contains pectolytic, cellulolytic and hemicellulolytic activities. This method for cleaning of heat exchangers is less time and energy consuming and more environmental-friendly than the hitherto used methods of this kind.

9 Claims, No Drawings

500
METHOD FOR CLEANING PLATE HEAT EXCHANGERS

This application is a 371 of PCT/DK92/00072 filed Mar. 6, 1992.

BACKGROUND OF THE INVENTION

1. Field of the Invention

The invention comprises a method for cleaning of heat exchangers after passage through the heat exchangers of a fluid which comprises vegetable dry matter, and which by transport through a passage will tend to generate deposits on exposed positions in the passage. Such fluid is typically a fluid, pulpy material, preferably fruit or vegetable juice, e.g. orange, pineapple, grape fruit, banana, grape or apple juice, or carrot, tomato, or celery juice. For the sake of brevity in the following such fluid will be identified as "fluid, pulpy material", and the deposits will be identified as pulp or pulp particles. The heat exchangers are preferably of the plate type.

In order to generate a good heat exchange the plates in a plate heat exchanger are usually placed in close proximity to each other, e.g. with a gap of around 2.2–6 mm, preferably 3.5–4 mm. Also, two adjacent plates have to touch each other at several hundred pointed positions per $m^2$ in order to secure the physical stability of the plate package during operation, when the pressure differential is at its maximum. It has been found, however, that the free passages between two adjacent heat exchanger plates are being clogged or at least narrowed considerably after passage of fluid, pulpy material, due to obstinate adherence of pulp particles to the plates, especially at the above indicated pointed positions, where two adjacent plates touch each other. This layer of pulp particles has to be removed from the heat exchangers in order to reestablish a satisfactory performance of the heat exchangers and furthermore for hygienic reasons. Also, if the pulp particles are not removed effectively, they can be released during a later heat exchange with a clear liquid, e.g. clear apple juice, which would be detrimental to the quality of the clear liquid. Hitherto two methods have been used for the purpose of removing the pulp particles from the heat exchangers. In the first place the plate heat exchanger assembly can be dismantled completely and cleaned mechanically. This is effective, but also a time consuming and cumbersome method. Ordinarily the so-called cip method (cip is short for cleaning in place) is used, i.e. great amounts of high pressure water is flushed through the heat exchanger in order to remove the layer of pulp particles, and also hot lye (NaOH) and/or a peroxide solution or hot lye and complex builders, such as EDTA, is flushed through for cleaning purposes. Even if this method is effective, it is time consuming, as it ordinarily lasts around 2–4 hours, and also energy consuming due to the necessity of the supply of high pressure water, the lye and/or peroxide solution treatment damages the rubber gaskets, which have to be replaced at shorter intervals, and also the lye and/or peroxide treatment presents an environmental problem. Furthermore, especially EDTA also presents an environmental problem. Also, in case the cip method is used, it has been found that even so it is necessary at certain time intervals, e.g. once a week, to dismantle the plate heat exchange assembly completely and carry out a mechanical cleaning. This cleaning problem is not a minor problem, but a problem which haunts the industrial world to a significant degree in consideration of the fact that on a global basis the annual amount of fluid, pulpy material which is sent through heat exchangers, run into millions of tons. Great efforts to solve this problem have been exercised, but so far in vain. An attempt to circumvent the problem is the so-called free flow heat exchanger, in which the gap between adjacent plates is much larger than in ordinary plate heat exchangers and in which no contact points between adjacent plates exist; however, the heat exchange capacity in such free flow heat exchangers is unsatisfactorily low.

Thus, the purpose of the invention is the provision of a method for cleaning of heat exchangers after passage of fluid, pulpy material, which is fruit or vegetable juice, through the heat exchangers, which method should be less time and energy consuming and present fewer environmental problems than the hitherto used methods of this kind.

Now, surprisingly, it has been found, according to the invention that the purpose of the invention can be fulfilled enzymatically.

Thus, the method according to the invention for cleaning of heat exchangers after passage through the heat exchangers of a fluid, which comprises vegetable dry matter, and which by transport through a passage will tend to generate deposits on exposed positions in the passage is characterized by the fact that the heat exchangers are exposed to a cip treatment with a solution of an enzyme preparation, which contains pectolytic, cellulolytic, and hemicellulolytic activities.

Surprisingly it has been found that the indicated enzymatic cip treatment effectively cleans the heat exchanger plates in much less time than usual, e.g. in around an hour, that high pressure treatment with large amounts of water is unnecessary, and that the lye or peroxide solution treatment is superfluous after the enzymatic cip treatment, whereby environmetal problems due to the lye or peroxide solution treatment are eliminated.

2. Discussion of Related Art

From GB-A-2094927a method of the category corresponding to the preamble of the main claim is described. However, the solution is not enzymatic, and it has been found that the enzymatic solution which is used according to the invention exhibits a superior cleaning effect in comparison to the prior art method.

U.S. Pat. No. 4,936,994 describes a method of attacking and removing microbial slime in slime covered surfaces and maintaining a slime-free surface as in exposed cooling tower surface and in waste water treatment and paper making. This prior art method comprises the use of an effective amount of a composite enzyme preparation consisting of a ratio of 2 parts of cellulase, 1 part of α-amylase and 1 part of protease. In the first place, the method according to the invention is directed specifically to cleaning of heat exchangers after deposition of pulp particles, whereas the prior art method is directed to removal of microbial slime from surfaces of e.g. cooling towers. In the second place, the enzyme mixture used according to the invention is quite different from the enzyme mixture used in the prior art method.

DESCRIPTION OF THE INVENTION

In a preferred embodiment of the method according to the invention the solution of an enzyme preparation, which contains pectolytic, cellulolytic, and hemicellulolytic activities also contains a proteolytic activity. It has been found that this enzyme mixture exhibits a very effective cleaning ability.

In a preferred embodiment of the method according to the invention the solution exhibits a pectolytic activity between 10 and 2000 FDU/g, a cellulolytic activity between 0.1 and 100 FCU/g, a hemicellulolytic activity between 1 and 500 FHCU/g, and a proteolytic activity between 0 and 200,000 HUT/g, preferably between 100 and 200,000 HUT/g. If the enzyme activities have values below the lower limits, the cleaning ability of the solution tends to be too low for practical applicability, and if the enzyme activities have values above the upper limits the cost of the enzyme is too high for practical applicability on a sound commercial basis. FDU is Fermentation Depectinisation Units. The definition of this activity unit is described in the brochure "Assay for the depectinisation of apple juice with enzymes (FDU)". FCU is Fermentation Cellulase Units. The definition of this activity unit is described in the brochure "Viscosimetric assay for cellulase (FCU)". FHCU is Fermentation Hemicellulase Units. The definition of this activity unit is described in the brochure "Viscosimetric assay for hemicellulase (HFCU)". HUT is Hemoglobin Unit Tyrosine. The definition of this activity unit is described in GB 2 115 820A, pages 14 and 15. The above brochures can be obtained on request from Novo Nordisk Ferment AG, Neumatt, CH-4243 Dittingen, Switzerland.

In a preferred embodiment of the method according to the invention the temperature of the solution is between 10° and 70° C., preferably between 35° and 45° C. These temperature intervals represent a reasonable compromise in regard to enzyme stability and necessary duration of the enzymatic cleaning.

In a preferred embodiment of the method according to the invention the pH of the solution is close to the pH optima of the pectolytic, the cellulolytic, the hemicellulolytic and the proteolytic activities, preferably between 3 and 7. In this manner the activity and thus the cleaning effect of the three or four enzymes is as high as possible.

In a preferred embodiment of the method according to the invention the solution is flushed through the heat exchanger in alternate directions. It has been found that also by means of the enzymatic cleaning according to the invention the cleaning effect is improved by means of flushing in alternate directions. The flushing can be performed as a usual low pressure flushing. This is a great advantage in comparison to the conventional cip cleaning which has to be performed as a high pressure flushing.

In a preferred embodiment of the method according to the invention the solution is flushed in one direction for 20–40 minutes and in the opposite direction for 20–40 minutes. One of the big advantages related to the cleaning process according to the invention is the fact that it needs only around an hour, whereas the conventional cip cleaning needs 2–4 hours.

In a preferred embodiment of the method according to the invention the solution is left in the heat exchanger over night. If operations are shut down over night anyway, this embodiment represents a much simpler and much more practical cleaning possibility than the conventional cip method.

In a preferred embodiment of the method according to the invention the solution contains a surfactant, preferably a non-ionic surfactant, in an amount of 0.1–20 g/l, preferably 1–3 g/l. Hereby an even better cleaning effect can be obtained. It has to be noted that the above use of surfactants are recommendable only in a few cases, due to the extraordinary high cleaning effect related to the enzymatic cleaning method according to the invention, and that the surfactants, if used, are used in small concentrations only and thus do not present any major environmental problems.

In the following examples 3, 4, 6, 8, and 9 a fouling agent of the following composition was used:

100 kg orange concentrate 50° Brix with 45 g of fibres/l 50 kg of water 10 kg of fibres Fibres: 50% of fibres with fibre length 0–5 mm 49% of fibres with fibre length 5–15 mm 1% of fibres with fibre length >15 mm With this fouling agent a fouling degree of 25% was generally obtained.

EXAMPLE 1

This example was conducted with an APV heat exchanger C 35 (pilot plant scale).

The first step was a standardized fouling which was produced as follows.

40 liters of orange concentrate was mixed with 40 liters of water, and this mixture was circulated for 2 hours at room temperature in the heat exchanger with a velocity of 4000 liter/hour. Then a rinsing operation with water was carried out twice, each rinse having a duration of 5 minutes, in opposite directions.

The first cleaning composition consisted of 75 liters of water with 500 g of NOVOFERM® 6 (protease) and 500 ml of NOVOFERM® 11 (pectinase, cellulase and hemicellulase), and the pH value thereof was adjusted to 4.0. This cleaning composition was introduced into the fouled heat exchanger at room temperature and left there for 44 hours.

The second cleaning composition consisted of 75 liters of water with 250 g of NOVOFERM® 6 and 500 ml of NOVOFERM® 11, and the pH value thereof was adjusted to 4.0. This cleaning composition was introduced into the fouled heat exchanger, which was precleaned as indicated above, at 40° C., with a circulation velocity of 4000 liters/hour and in changing directions (3×15 minutes).

By inspection the following cleaning effect could be observed:

Channel 1,2,3: 100% clean

Channel 4,5,6: 99% clean

NOVOFERM® 6 is a proteolytic enzyme preparation prepared by means of an *Aspergillus niger* strain, and it contains the following activities:

47 FDU/g

0 FCU/g

FHCU/g 137,000 HUT/g

NOVOFERM® 11 is a mixed enzyme preparation prepared by means of an *Aspergillus aculeatus* strain, an *Aspergillus niger* strain and a *Trichoderma reesei* strain, and it contains the following activities:

2252 FDU/g

78 FCU/g

486 FHCU/g

450 HUT/g

Thus, the approximate 75 liters of the first cleaning composition contain the following activities:

15.3 FDU/g 0.52 FCU/g 3.2 FHCU/g

916 HUT/g

The approximate 75 liters of the second cleaning composition contained the following activities:

15.2 FDU/g
0.52 FCU/g
3.2 FHCU/g
460 HUT/g

EXAMPLE 2

This example was conducted with an APV heat exchanger C 35 (pilot plant scale).

The first step was a standardized fouling which was produced as follows.

40 liters of orange concentrate was mixed with 40 liters of water, and this mixture was circulated for 4 hours at 90° C. in the heat exchanger with a velocity of 4000 liter/hour. Then a rinsing operation with water was carried out twice, each rinse having a duration of 5 minutes, in opposite directions.

The first cleaning composition consisted of 75 liters of water with 125 g of NOVOFERM® 6 and 500 ml of NOVOFERM® 11, and the pH value thereof was adjusted to 4.0. This cleaning composition was introduced into the fouled heat exchanger at room temperature and left there for 16 hours.

The second cleaning composition consisted of 75 liters of water with 250 g of NOVOFERM®6 and 500 ml of NOVOFERM®11, and the pH value thereof was adjusted to 4.0. This cleaning composition was introduced into the fouled heat exchanger, which was precleaned as indicated above, at 40° C., with a circulation velocity of 5000 liters/hour and in changing directions (3×30 minutes).

By inspection the following cleaning effect could be observed:

Channel 1,2,3:>99% clean

Channel 4,5,6: 99% clean

Thus, the approximate 75 liters of the first cleaning composition contain the following activities:

15.1 FDU/g
0.52 FCU/g
3.2 FHCU/g
231 HUT/g

The second cleaning composition contained the same listed activities as the second cleaning composition in Example 1.

EXAMPLE 3

A heat exchanger with APV plate type C 35 was used.

The purpose of this example was to evaluate the cleaning after one hour of cip.
1) The standard fouling agent was used for the fouling.
2) The fouling agent was circulated through the heat exchanger for 2.5 hours at a flow of 3000 l/hour and an initial PD of 0.46 bar. After 10 minutes the PD increased to 0.53 bar.
3) The heat exchanger was-flushed with cold water for 2×5 minutes, flow 4000 l/hour.
4) cip at 40° C., pH 5.0, 1% NOVOFERM® 11. cip flow 4200–4400 l/hour, corresponding to a PD of 0.48 bar, for 4×15 minutes.
5) 5 minutes of flushing with cold water.
6) 3×5 minutes of flushing with cold water.
7) Opening for inspection. The cleaning effect was excellent.

EXAMPLE 4

A heat exchanger with APV plate type C 35 was used.

The purpose of this example was partly to evaluate the cleaning effect when changing direction more often.
1) The standard fouling agent was used for the fouling.
2) The fouling agent was circulated for 2.5 hours with 6100 l/hour. The following pressure drops (PD) were measured across the heat exchangers:

| Time  | PD       |
|-------|----------|
| 09.30 | 0.59 bar |
| 10.00 | 0.77 bar |
| 10.30 | 0.83 bar |
| 11.00 | 0.84 bar |
| 11.30 | 0.88 bar |
| 12.00 | 0.88 bar |

3) After production, the fouling agent was flushed out of the heat exchanger with cold water for 2×5 minutes, flow 3000 l/hour.
4) The heat exchanger was cip cleaned with 4500 l/hour for 12×5 minutes, corresponding to a pressure drop of 0.48 bar, temperature 40° C., pH 5, and 1% NOVOFERM® 11.
5) The cip liquid was flushed out, 2×5 minutes.
6) Opening for inspection. The cleaning effect was excellent.

EXAMPLE 5

A heat exchanger with APV plate type T4 Plant was used.

The purpose of this example was to examine the possibility of cleaning plate heat exchangers with many contact points.

Fouling agent mixture with 28.5° Brix and pH 3.2:

30 kg of orange concentrate 50° Brix as described previously 10 kg of water 3 kg of fibres as described previously The fouling agent had previously been circulated for 2 hours, and in order to generate an extensive fouling 3 kg of fibres were added.
1) Circulation of product for 2 hours, flow 270 l/hour

| Time  | PD      |               |
|-------|---------|---------------|
| 10.30 | 4.5 bar |               |
| 11.00 | 2.7 bar |               |
| 11.30 | 3.0 bar |               |
| 12.00 | 3.0 bar |               |
| 12.30 | 2.8 bar | flow 245 l/hour |

2) 2×5 minutes of flushing of the product with water with a flow of 400 l/hour.
3) Circulation of cip liquid for 4×15 minutes, flow 440 l/hour, PD 1.2 bar, 1% NOVOFERM® 11, 40° C. and pH 5.0.
4) Flushing with cold water for 2×5 minutes
5) Opening for inspection. The cleaning effect was excellent.

EXAMPLE 6

Two heat exchangers with APV plate type C 35 were used.

The purpose of this example was the provision of an evaluation of the cleaning effect depending on cleaning time, with unchanged concentration of cleaning agent.

The standard fouling was used for the fouling.

1) The fouling agent was circulated through both heat exchangers for 2.5 hours at a flow of 6100 l/hour.

| Start | PD 0.6 bar |
| --- | --- |
| Finish | PD 0.9 bar |

2) The fouling agent was flushed with water for 3×5 minutes at a flow of 6100 l/hour.
3) 1% NOVOFERM®11 cleaning agent was added at 40° C. and pH 5.
4) The first heat exchanger was left with cip liquid for 3 hours. 3 minutes of circulation out of every 15 minutes. After 3 hours, circulation for 12×5 minutes, flow 4000 l/hour.
5) The second heat exchanger was left with cip liquid for one hour. 3 minutes of circulation out of every 15 minutes. After one hour, circulation for 12×5 minutes, flow 4000 l/hour.
6) The cleaning process was followed by flushing with cold water for 1×5 minutes, flow 4000 l/hour per heat exchanger.
7) Opening of both heat exhangers for inspection. The cleaning effect was excellent, 97–99%.

EXAMPLE 7

A heat exchanger with APV plate type T4 was used.

The purpose of this example was to evaluate the cleaning effect in a heat exchanger with APV plate type T4.
1) The same fouling agent as in Example 5 was used.
2) The fouling agent was circulated for 2 hours.

| Time | flow | PD |
| --- | --- | --- |
| 08.25 | 469 l/h | 3.5 bar |
| 08.57 | 416 l/h | 3.9 bar |
| 09.27 | 378 l/h | 4.0 bar |
| 09.58 | 360 l/h | 4.0 bar |
| 10.30 | 343 l/h | 4.0 bar |

Fouling approximately 33%.
3) The heat exchanger was flushed with cold water for 2×5 minutes, flow 489 l/hour, PD 1.7 bar.
4) The cip liquid contained 1% NOVOFERM® 11, and it had a temperature of 40° C. and a pH of 5. The cip liquid was circulated for 4×30 minutes with a flow of 475 l/hour and at a PD of 0.75 bar.
5) Flushing with hot water for 2×5 minutes with a flow of 475 l/hour.
6) Opening for inspection. The cleaning effect was excellent.

EXAMPLE 8

Two heat exchangers with APV plate type C 35 were used.

The purpose of this example was the provision of an evaluation of the influence of standing time and cleaning flow on the cleaning effect.
1) The standard fouling agent was used for the fouling.
2) The fouling agent was circulated for 2.5 hours at a flow of 3000 l/hour per heat exchanger.
3) The two heat exchangers were flushed simultaneously for 3×5 minutes with cold water, flow 6100 l/hour.
4) A cip cleaning liquid containing 1% NOVOFERM® 11, with a temperature of 40° C. and a pH of 5 was added to the first heat exchanger (sanitary) and circulated for 12×5 minutes, flow 5100 l/hour, corresponding to a PD of 0.7 bar.
5) Flushing with water for 1×5 minutes, flow 5000 l/hour.
6) Opening for inspection.
7) The above indicated 1% cip cleaning liquid at 40° C. was added to the second heat exchanger, subsequent standing, standing time 18 hours.
8) The cip cleaning liquid was circulated at 40° C. for 12×5 minutes, flow 3000 l/hour. Then 1×5 minutes of flushing with cold water was carried out.
9) Opening for inspection. The cleaning results for both heat exchangers were excellent, corresponding to a cleaning effect of 97–99%.

EXAMPLE 9

A-heat exchanger with APV plate type C 35 was used.

The primary purpose of this example was the achievement of 100% cleaning effect based on the experience obtained through the preceding examples.
1) The standard fouling agent was used for the fouling.
2) Fouling with the fouling agent at a flow of 3000 l/hour for 2 hours was carried out

| Time | PD |
| --- | --- |
| 10.45 | 0.50 bar |
| 11.30 | 0.70 bar |
| 12.00 | 0.80 bar |
| 13.00 | 0.88 bar |

3) The heat exchanger was flushed for 2×3 minutes with cold water, flow 6000 l/hour, corresponding to a PD of 0.90 bar.
4) A cip cleaning liquid containing 1% NOVOFERM® 11, with a temperature of 40° C. and a pH of 5 was circulated for 12×5 minutes, flow 6000 l/hour.
5) Flushing with cold water for 3×3 minutes, flow 6000 l/hour.
6) Opening for inspection. The result was a 100% cleaning effect.

EXAMPLE 10

A heat exchanger with APV plate type T4 was used.

The purpose of this example was to achieve acceptable cleaning of the T4 plate without regard to the level of cost.
1) The same fouling agent as in Example 7 was used.
2) The fouling agent was circulated for 2 hours.

| Time | flow | PD |
| --- | --- | --- |
| 13.15 | 375 l/h | 3.6 bar |
| 13.30 | 383 l/h | 3.7 bar |
| 13.45 | 366 l/h | 3.5 bar |
| 14.00 | 391 l/h | 3.5 bar |

The fouling was very complicated with long, heavy fibres, which are very difficult to decompose.
3A cip cleaning liquid containing 2% NOVOFERM® 11 and 1% Celluclast® 1.5, with a temperature of 40° C. and a pH of 5.0 was used. The cip liquid was left standing for 19 hours, and subsequently cip treatment was carried out for 8×15 minutes at a flow of 790 l/hour at 40° C.
4) Flushing for 2×5 minutes, flow 790 l/hour.
5) Inspection. Only few fibres were found in the heat exchanger. The cleaning effect was evaluated to be 97–99%, which must be considered a very fine result.

EXAMPLE 11

A heat exchanger with APV plate type T4 was used.

This was an additional test performed to establish the influence of the standing time on the cleaning effect.
1) The same fouling agent as in Example 7 was used.
2) The fouling agent was circulated for 2 hours.

| Time | flow | PD |
|---|---|---|
| 13.00 | 400 l/h | 2.2 bar |
| 13.30 | 371 l/h | 2.4 bar |
| 14.00 | 313 l/h | 2.3 bar |
| 14.20 | 296 l/h | 2.2 bar |

3) Flushing with cold water for 1×5 minutes, flow 400 l/hour.
4) A cold cip cleaning liquid containing 1% NOVOFERM® 11 was used. After 24 hours 1% Celluclast® 1.5 cip cleaning liquid was added and circulated for 10 minutes. Celluclast® 1.5 is a cellulase preparation with a cellulolytic activity of 100 FCU/g. Thereafter 45 hours of standing time.

Further, the cip cleaning liquid was circulated for 6×2 minutes during the 45 hours.
5) Flushing with hot water for 1×5 minutes.
6) Opening for inspection. The cleaning effect was excellent, above 99%.

We claim:

1. A method for cleaning a plate heat exchanger after a fluid which comprises a vegetable dry matter passes through the plate heat exchanger, comprising a cleaning in place treatment with a solution comprising an enzyme preparation which contains a pectolytic, a cellulolytic, a hemicellulolytic activity and a proteolytic activity, wherein the pectolytic activity is between 10 and 2000 FDU/g, the cellulolytic activity is between 0.1 and 100 FCU/g, the hemicellulolytic activity is between 1 and 500 FHCU/g, and the proteolytic activity is between 0 and 200,000 HUT/g and wherein the temperature of the solution is between 10° and 70° C. and wherein the plate heat exchanger has contact points and a plurality of plates separated from each other by at least about 2.2 mm.

2. The method according to claim 1, wherein the temperature of the solution is between 35° to 45° C.

3. The method according to claim 1, wherein the pH of the solution is between 3 and 7.

4. The method according to claim 1, wherein the solution is flushed through the heat exchanger in alternate directions.

5. The method according to claim 4, wherein the solution is first flushed through the plate heat exchanger in one direction for 20–40 minutes and then flushed in the opposite direction for 20–40 minutes.

6. The method according to claim 1, wherein the solution is allowed to stand in the plate heat exchanger overnight.

7. The method according to claim 1, wherein the solution further comprises a surfactant in an amount of 0.1–20 g/l.

8. The method according to claim 7, wherein the surfactant is present in an amount of 1–3 g/l.

9. The method according to claim 7, wherein the surfactant is a non-ionic surfactant.

* * * * *